US007099843B1

(12) United States Patent
Cassidy et al.

(10) Patent No.: US 7,099,843 B1
(45) Date of Patent: Aug. 29, 2006

(54) REFERENCE POOLS AS CREDIT ENHANCEMENTS

(75) Inventors: Henry James Cassidy, Arlington, VA (US); David Kevin Horne, Arlington, VA (US); Tyler Taile Yang, Potomac, MD (US); John Patrick McMurray, McLean, VA (US)

(73) Assignee: Freddie Mac, The Federal Home Loan Mortgage Co., McLean, VA (US)

( * ) Notice: Subject to any disclaimer, the term of this patent is extended or adjusted under 35 U.S.C. 154(b) by 0 days.

(21) Appl. No.: 10/096,584

(22) Filed: Mar. 14, 2002

Related U.S. Application Data

(63) Continuation of application No. 10/059,142, filed on Jan. 31, 2002, now abandoned, which is a continuation-in-part of application No. 09/602,254, filed on Jun. 23, 2000.

(60) Provisional application No. 60/151,071, filed on Aug. 27, 1999.

(51) Int. Cl.
*G06F 17/60* (2006.01)
(52) U.S. Cl. .................. 705/38; 705/35; 705/36 R
(58) Field of Classification Search .......... 705/35–40
See application file for complete search history.

(56) References Cited

U.S. PATENT DOCUMENTS

| | | | | |
|---|---|---|---|---|
| 5,950,175 | A * | 9/1999 | Austin | 705/36 R |
| 5,966,700 | A * | 10/1999 | Gould et al. | 705/38 |
| 6,070,151 | A * | 5/2000 | Frankel | 705/36 R |
| 6,167,384 | A | 12/2000 | Graff | |
| 6,249,775 | B1 * | 6/2001 | Freeman et al. | 705/36 |
| 6,330,541 | B1 | 12/2001 | Meyer et al. | |
| 6,360,210 | B1 * | 3/2002 | Wallman | 705/36 |
| 2002/0019789 | A1 * | 2/2002 | Ginsberg | 705/36 |
| 2002/0035530 | A1 * | 3/2002 | Ervolini et al. | 705/36 |

FOREIGN PATENT DOCUMENTS

| | | | |
|---|---|---|---|
| WO | WO 94/23528 | * | 3/1994 |
| WO | WO 2005/059781 A1 | * | 6/2005 |

OTHER PUBLICATIONS

Padgette "Performance Reporting: The basics and beyond: Part I", Journal of Financial Planning, Jul. 1995 pp. 110-118.*
Anonymous "Newly Launched Russell/Mellon Analytical Services Combines Global Client Base to Serve more than $ 2 Trillion in Assets" Newswire, Jan. 20, 1999, p. 1488.*
Anonymous "Benchmarks for evaluating performance" Association Management Jun. 1998, pp. 64.*

* cited by examiner

*Primary Examiner*—Hani M. Kazimi
*Assistant Examiner*—Narayanswamy Subramanjan
(74) *Attorney, Agent, or Firm*—Finnegan, Henderson, Farabow, Garrett & Dunner, L.L.P.

(57) ABSTRACT

The disclosed systems and methods for hedging risk of differential loss related to separate pools of loan investments use criteria established by the parties for hedging risk of differential loss rates. The system monitors indirect performance indicators for a Reference Pool and a Subject Pool of loans, compares the indicators, and calculates a payment due between the parties (if any) based on performance differences for the two pools and a payment formula. Any payment due is paid according to a pre-established payment cycle. The loan pools may be formed and adjusted based on various factors, such as to compensate for changes in one of the pools. The payment formula may also be adjusted to compensate for changes or differences in the loan pools. The system may hedge either party's credit loss related to the Subject Pool if its loans perform differently than the loans in the Reference Pool.

48 Claims, 8 Drawing Sheets

ACTUAL LIQUIDATION PROCEEDS + MAKE-WHOLE PAYMENT = 100%

REFERENCE POOLS AS CREDIT ENHANCEMENTS

RELATED APPLICATION DATA

This is a continuation of application Ser. No. 10/059,142, filed Jan. 31, 2002 now abandoned, which is a continuation-in-part of application Ser. No. 09/602,254, filed on Jun. 23, 2000, and claims the benefit of U.S. provisional application No. 60/151,071, filed Aug. 27, 1999, which are incorporated herein by reference.

BACKGROUND OF THE INVENTION

A. Field of the Invention

The present invention generally relates to financial instruments, and systems and methods for issuing and administering the same. More particularly, the invention relates to systems and methods for separating certain payment rights associated with a pool of assets (which may or may not be securitized) from the remaining payment rights associated with the pool, such that the separated payment obligations form separately transferable financial instruments. Guarantee Certificates evidence an obligation of a mortgage insurer or a securities guarantor to make payments triggered by certain events, typically, default-related events involving a corresponding (in the case of a mortgage insurer) or an underlying (in the case of a securities guarantor) mortgage loan or loans.

The present invention also relates to systems and methods for hedging risk of loss on financial investments. The financial investments may include a pool of assets (which may or may not be securitized).

B. Description of the Related Art

Mortgage insurers regularly write contracts that cover the actual or estimated losses associated with the delinquency and default of mortgage loans. In the absence of mortgage insurance, when a mortgage loan becomes delinquent, the holder of the note typically loses interest payments it would otherwise have received and also may incur expenses associated with foreclosure and liquidation of the mortgaged property. The proceeds from liquidation also may fall short of the amount of principal due to the note holder. If, in lieu of a foreclosure, the mortgage loan is renegotiated in connection with the default, the note holder also may experience losses associated with the workout of the loan. In any case, mortgage insurance would reimburse the note holder for all or part of the foregone interest, expenses and liquidation shortfall.

In the case of loans that have been securitized, i.e., turned into a security, mortgage-backed security investors may turn to bond insurers or government-sponsored enterprises to mitigate losses arising from default of the underlying mortgage loans. These parties typically guarantee the timely payment of loan principal, interest or both. In exchange for a fee, these guarantors absorb all or a portion of the losses that would otherwise be associated with the guaranteed securities. When a securitized mortgage loan experiences a payment default, the guarantor typically compensates the security holder for the difference between scheduled principal and interest payments and the aggregate net amount which is actually realized from a workout or liquidation. As is the case with payments from mortgage insurers, this "make-whole" payment is passed along to a security holder undistinguished from the payment of interest and return of loan principal through normal means, such as amortization or prepayment.

In addition, the guarantor generally ensures that these payments are made to the securities investor at the originally scheduled time, so that the investor does not bear the risk or expense of delays inherent in the loan workout or foreclosure/liquidation process. The existence of insurance for a mortgage loan, or of a guarantee for a mortgage-backed security, is generally established at the beginning of the life of the loan or security in question. A contract between the insurer/guarantor and the investor or trustee sets the terms of the arrangement. A feature of this contract is that the payment obligation of the insurer or guarantor always runs to the owner of the insured or guaranteed asset so that the asset and the insurance cannot be decoupled, even if the value of the arrangement to the owner changes. This feature makes the arrangement illiquid and potentially less valuable.

Investors who purchase pools of mortgage loans typically collect a great deal of information about the loans in order to assess the risk associated with the investment. For example, an investor might want to know the borrower's income, credit score and other financial obligations, as well as the assessed value of the property and the loan to value ratio. Based on this information, the investor can statistically evaluate the probability that the loans in the pool will default and thereby determine the price he or she is willing to pay for the pool of loans. However, if some or all of the desired information is unavailable, the pool is an undesirable investment. In particular, an investor may be reluctant to purchase such a pool or may be willing only to pay a low price for it. And although an investor may attempt to hedge the risk of loss on such a pool, available hedging techniques do not accurately reflect the probability that the loans in the pool will default.

SUMMARY OF THE INVENTION

The present invention includes the use of a financial instrument (referred to herein as a "Guarantee Certificate") that takes the payment obligations of the mortgage insurers and securities guarantors and places them into a separate, transferable financial instrument. Guarantee Certificates of the present invention pay an investor(s) based on specified triggering events associated with a loan pool. Triggering events can be defined by loan delinquency, foreclosure on a property backing an insured or guaranteed mortgage, acquisition of a deed in lieu of foreclosure of the collateral, or liquidation of a property formerly backing an insured or guaranteed mortgage. The Guarantee Certificate may offer payment based on a fixed percentage of the defaulted loan principal, payment of actual or estimated losses, or a formula that combines these or other elements or a multiple of the same. The loan pool for a given Guarantee Certificate could include one or more loans of any type or origin.

Issuers can create Guarantee Certificates either by restructuring the cash flows from existing insurance or guarantee arrangements, or by issuing the securities de novo. In a restructuring, the issuer pools loans or securities already insured or guaranteed and places them in a trust. The trustee identifies and segregates the cash flows paid to satisfy insurance or guarantee claims, and the trust issues Guarantee Certificates entitled to receive a specified schedule of the insurance or guarantee payments. The payments can be a straight dollar-for-dollar pass-through of the insurance or guaranty payments, or can be determined by a formula based on the payments. In a de novo issuance, the issuer specifies a set of loans (which may or may not be securitized) as a Reference Pool and issues Guarantee Certificates entitled to receive formula-based cash flows triggered by specified events or conditions in the Reference Pool. The Reference pool may be static or dynamic.

In another embodiment of the present invention, systems and methods are disclosed for using Reference Pools as credit enhancements for hedging risk of loss on loan investments. Such systems and methods use criteria established by the parties for hedging risk of loss on the purchase and sale of loan investments. Such systems and methods may monitor the performance of a Reference Pool and a Subject Pool of loans. The Subject Pool of loans may include loans that are the subject of the investment transaction. The Reference Pool may include loans having similar characteristics to loans in the Subject Pool. Further, such systems and methods may compare the monitored performances of loans in the Reference Pool and the Subject Pool. At the end of a payment cycle, such as the end of a fiscal year, such systems and methods may calculate a payment due to the buyer or seller based on the comparison of the monitored performances of loans in the Reference Pool and the Subject Pool, and an established payment formula. Thereafter, such systems and methods may generate an invoice or a payment form, such as a check payable to one of the parties based on the calculated payment due. The effect of such systems and methods is to hedge against the loss resulting from the difference in performance between the loans in the Reference Pool and the Subject Pool. In addition, such systems and methods may generate and/or adjust the composition of the Reference Pool of loans based on comparable attributes of the Subject Pool of loans.

BRIEF DESCRIPTION OF THE DRAWINGS

The accompanying drawings, which are incorporated in and constitute a part of this specification, illustrate the various features and aspects of the invention and, together with the description, explain the advantages and principles of the invention. In the drawings.

DETAILED DESCRIPTION

Figure 1:
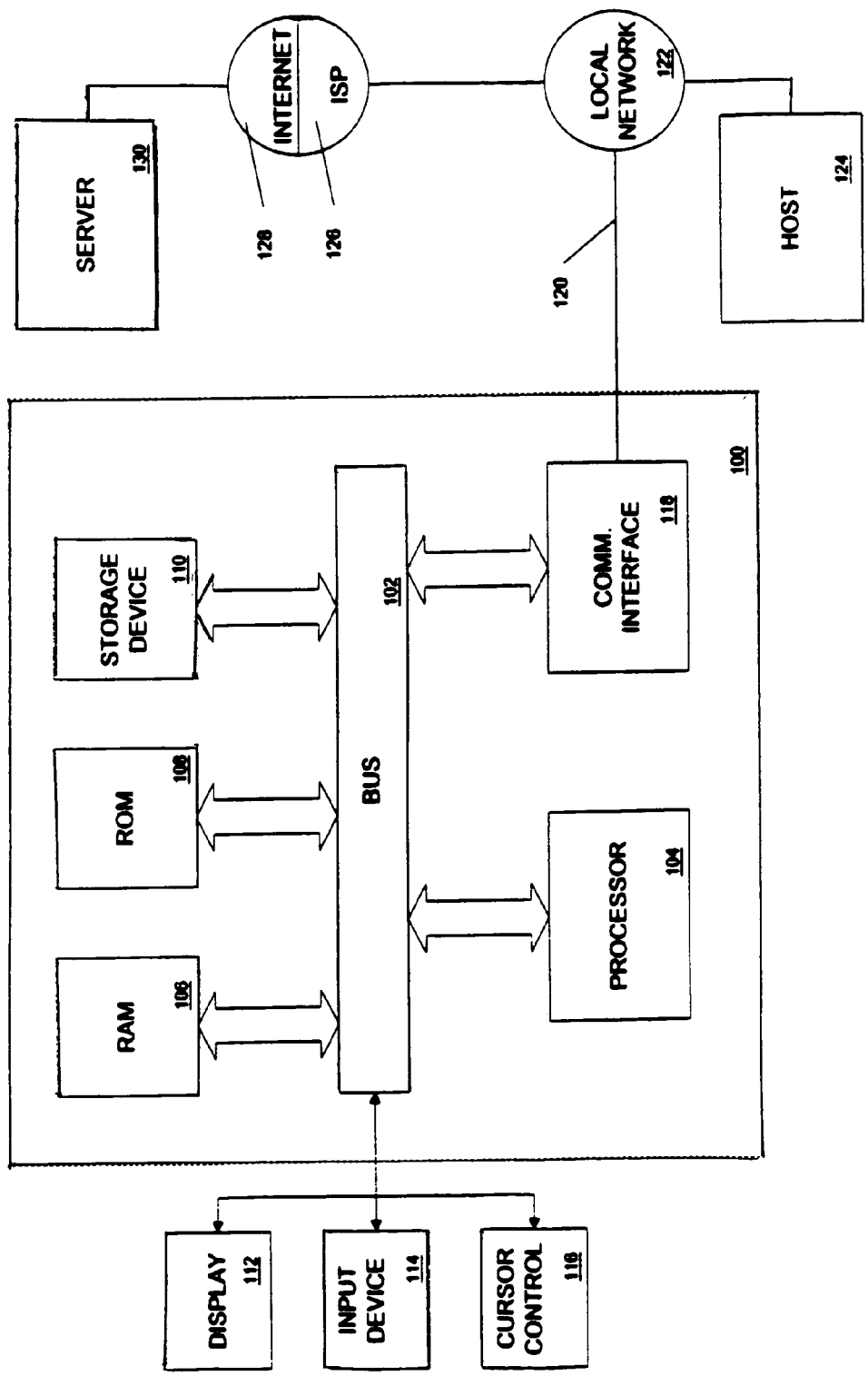
FIG. 1 is a schematic block diagram of a data processing system architecture suitable for use with the present invention.

Reference will now be made in detail to an implementation of the present invention as illustrated in the accompanying drawings. Wherever possible, the same reference numbers will be used throughout the drawings and the following description to refer to the same or like parts.

Overview

Systems and methods consistent with the present invention process information corresponding to Guarantee Certificates, which are financial instruments that evidence the obligation of an insurer or a guarantor to make payments that are triggered by certain events. The triggering event creates the payment obligation.

In one embodiment, a Guarantee Certificate evidences the obligation of a mortgage insurer or a securities guarantor to make payments that are triggered by events, typically, default-related events, involving a related (in the case of a mortgage insurer) or an underlying (in the case of a securities guarantor) mortgage loan or loans. For example, the instrument might evidence the obligation of a mortgage insurer or securities guarantor to make payments to the Guarantee Certificate holder based on the payment default of a borrower or borrowers with respect to the group (the "Reference Pool") of related or underlying mortgage loans (the "Reference Loans" or "Reference Pool elements") associated with the Guarantee Certificate.

A data processing system tracks the status of the Reference Loans (elements) in a series of Reference Pools uniquely associated with each Guarantee Certificate. When the data processing system identifies a default under a Reference Loan or another payment-triggering event, it calculates the amount payable to the appropriate Guarantee Certificate holder.

A unique feature of Guarantee Certificates is that they are decoupled from, and therefore, in one preferred embodiment, may be bought, sold, and conveyed independently of the Reference Loans and/or mortgage-backed securities representing an interest in the Reference Loans that are the source of the payment-triggering events. In other words, Guarantee Certificates can be made tradable, if the issuer so desires.

In another embodiment, a Reference Pool of loans may be used as a credit enhancement for hedging (sharing) risk of loss on loan investments. For example, a seller may wish to sell a pool of loans to a buyer, but the buyer may be reluctant to purchase such loans because of a lack of information to determine a default risk factor for such loans. In order to overcome this uncertainty, the buyer and seller may enter into a risk-sharing arrangement in connection with the transaction. For convenience, the pool of loans is referred to as a Subject Pool. In such an arrangement, a Reference Pool may be created with loans having attributes that are comparable to attributes of loans in the Subject Pool.

The arrangement may stipulate a payment formula and one or more payment cycles. At the end of each payment cycle, a payment may be made to one party by the other party based on the payment formula and the performance of the loans in the Subject Pool and the Reference Pool. For example, at the end of a payment cycle, the data processing system may use the payment formula to determine the cumulative dollar losses on loans in the Subject Pool and the Reference Pool. If cumulative losses on loans in the Reference Pool exceed those of loans in the Subject Pool, the buyer may pay the seller the amount that the Reference Pool losses exceed the Subject Pool losses. However, if cumulative losses on loans in the Subject Pool exceed those of loans in the Reference Pool, the seller may pay the buyer the amount that the Subject Pool losses exceed the Reference Pool losses.

Adjustments may be made to the Reference Pool when a change occurs to the composition of the Reference Pool or the Subject Pool. For example, adjustments may be made to the Reference Pool when a change occurs to the number of loans or the size (i.e., unpaid principal balance ("UPB")) of the Subject Pool or the Reference Pool due to, for example, prepayment of loans. The adjustments may include adding or deleting loans to/from the Reference Pool to maintain the relative number of loans in the two pools or the relative total dollar amount of the UPB in the two pools. Alternatively, the payment formula may include adjustments to take into account the change in the number of loans or the total dollar amount of the UPB of the Subject Pool or the Reference Pool due to, for example, prepayment of loans. Such adjustments may be made to ensure comparability of the two pools of loans.

Reference will now be made in detail to exemplary embodiments of systems and methods consistent with the present invention, which are also illustrated in the accompanying drawings. Those of ordinary skill in the relevant art will recognize from the description that other embodiments are possible, and changes may be made to the implementations described herein without departing from the spirit and scope of the invention.

Data Processing System Architecture

The present invention may be implemented by computers or workstations organized in a distributed processing system architecture, with any suitable combination of software, hardware, and/or firmware.

FIG. 1 is a block diagram that illustrates a data processing system 100 in which methods and systems consistent with the present invention may be implemented. System 100 includes a bus 102 or other communication mechanism for communicating information, and a processor 104 coupled with bus 102 for processing information. System 100 also includes a main memory, such as a random access memory (RAM) 106 or other dynamic storage device, coupled to bus 102 for storing information and instructions to be executed by processor 104. RAM 106 also may be used for storing temporary variables or other intermediate information during execution of instructions by processor 104. System 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

System 100 may be coupled via bus 102 to a display 112, such as a cathode ray tube, for displaying information to a user. An input device 114, including alphanumeric and other keys, is coupled to bus 102 for communicating information and command selections to processor 104. Another type of user input device is a cursor control 116, such as a mouse, a trackball or cursor direction keys, for communicating direction information and command selections to processor 104 and for controlling cursor movement on display 12. This input device typically has two degrees of freedom in two axes, a first axis (e.g., x) and a second axis (e.g., y), that allow the device to specify positions in a plane.

The present invention is related to the use of system 100 for issuing and maintaining Guarantee Certificates. In addition, the present invention is related to the use of system 100 for utilizing reference pools as credit enhancements. These operations may involve accessing information from remote platforms and transmitting information to remote platforms. According to one implementation of the invention, information from remote platforms is provided to system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In an alternative implementation, hard-wired circuitry may be used in place of or in combination with software instructions to implement the invention. Thus implementations of the invention are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of radio frequency, acoustic or light waves, such as those generated during radio-wave and infra-red data communications.

Common forms of computer-readable media include, for example, a floppy disk, a flexible disk, a hard disk, a magnetic tape, any other magnetic medium, a CD-ROM, any other optical medium, a punch card, a paper tape, any other physical medium with patterns of holes, a RAM, a PROM, an EPROM, a FLASH-EPROM, any other memory chip or cartridge, a carrier wave as described hereinafter, or any other medium from which a computer processor can read.

Various forms of computer readable media may be involved in carrying one or more sequences of one or more instructions and/or data to processor 104. For example, instructions may initially be carried on the magnetic disk of a remote computer. The remote computer can load the instructions into its dynamic memory and send the instructions over a telephone line using a modem. A communication interface 118 local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to main memory 106, from which processor 104 retrieves and executes the instructions. The instructions received by main memory 106 may optionally be stored on storage device 110 either before or after execution by processor 104.

As shown, system 100 includes communication interface 118 coupled to bus 102. Communication interface 118 provides a two-way data communication coupling to a network link 120 that is connected to a local network 122. For example, communication interface 118 may be an integrated services digital network (ISDN) card, or a modem to provide a data communication connection to a corresponding type of cable or telephone line, or an infrared-transmitting modem directly connected to local network 120 and connected via an infrared detector to bus 102, as discussed above. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry analog or digital data streams representing various types of information.

Network link 120 typically provides data communication through one or more networks to other data devices. For example, network link 120 may provide a connection through local network 122 to a host computer 124 and/or to data equipment operated by an Internet Service Provider (ISP) 126. ISP 126 in turn provides data communication services through the Internet 128. Local network 122 and Internet 128 both use electric, electromagnetic or optical signals that carry digital data streams. The signals through the various networks and the signals on network link 120 and through communication interface 118, which carry the digital data to and from system 100, are exemplary forms of carrier waves transporting the information.

System 100 can send messages and receive data, including program code, through the network(s), network link 120 and communication interface 118. In the Internet example, a server 130 might transmit a requested code for an application program through Internet 128, ISP 126, local network 122, network link 120, and communication interface 118. In accordance with the present invention, one such downloaded application provides a bridge between two remote information sources, as described herein. The received code may be executed by processor 104 as it is received, and/or stored in storage device 110, or other non-volatile storage for later execution. In this manner, system 100 may obtain application code in the form of a carrier wave.

Although system 100 is shown in FIG. 1 as being connected to one server, 130, those skilled in the art will recognize that computer system 100 may establish connections to multiple servers on Internet 128. Each such server includes an Internet application such as an HTML- or XML-based application, which may provide information to computer system 100 upon request in a manner consistent with the present invention.

The system architecture just described is exemplary. One of ordinary skill in the art could easily substitute, replace, add, or eliminate various components without departing from the principles of the present invention. For example, the various networks and communication paths described could be implemented using DSL, cable, wireless, and/or Internet technology in place of the technology described.

Guarantee Certificates

In one embodiment, steps according to the present invention are embodied in machine-executable software instructions, and components of the present invention are carried out in a processing system by a processor executing the instructions. In other embodiments, hardwired circuitry may be used in place of, or in combination with, software instructions to implement the present invention.

Figure 2:
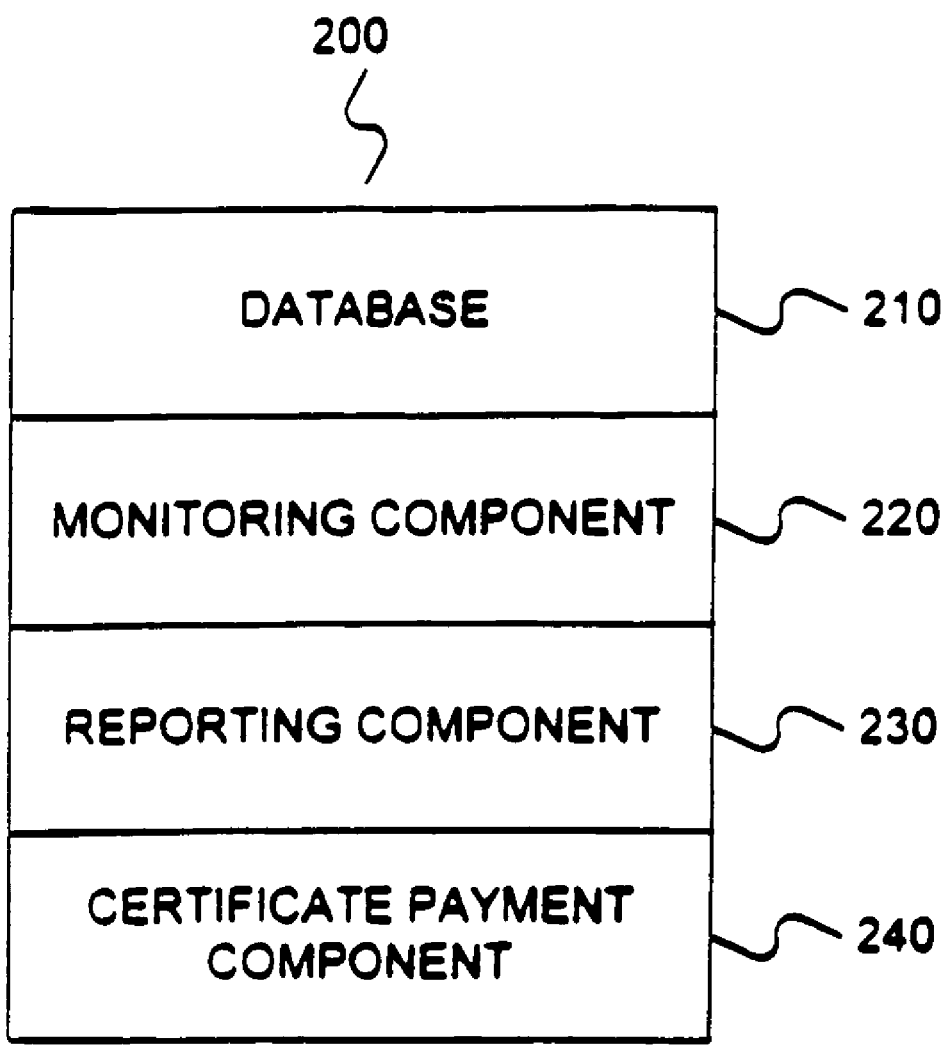
FIG. 2 is a block diagram of the components of a system for managing Guarantee Certificates.

In one embodiment, system 100 uses four software components to support Guarantee Certificates in a manner consistent with the present invention. As shown in FIG. 2, the components 200 include a database management system 210, a monitoring component 220, a reporting component 230, and a certificate payment component 240.

(1) Database Management System

Database management system ("database") 210 holds identifying information, including the initial attributes, of each loan or other element of the Reference Pool that is the source of the "guaranteed" risk, including the identity of the Reference Pool or Reference Pools to which each element belongs. For example, in the case of a Reference Pool of mortgages, database 210 holds information and attributes for mortgage loans in the pool. Database 210 also holds information on the ongoing status or performance of each element in the Reference Pool. In the case of mortgage risk, ongoing information could include coupon history, principal balance history, payment history, delinquency history, borrower's credit history, and any other information on a variable aspect of a given loan. Database 210 may also hold information concerning a Guarantee Certificate itself, such as the elements in the certificate's Reference Pool, the current holder or holders of the certificate, and the certificate's conveyance history. Database 210 has the ability to accept either manual or electronic input and to deliver either printed or electronic output.

Database 210 uses a query language (such as standard query language "SQL") to access stored information. The query language allows the user to extract data either using a keyboard or using another program without knowing the detailed structure of the database. For example, the user might be able to request, using a query language query, a payment history for all 30-year loans originated in 1993 without knowing precisely where this information is located in database 210. In addition, database 210 includes methods of checking for possible data input errors and/or data inconsistencies and for reporting and/or correcting those errors and inconsistencies.

(2) Monitoring Component

Figure 3:
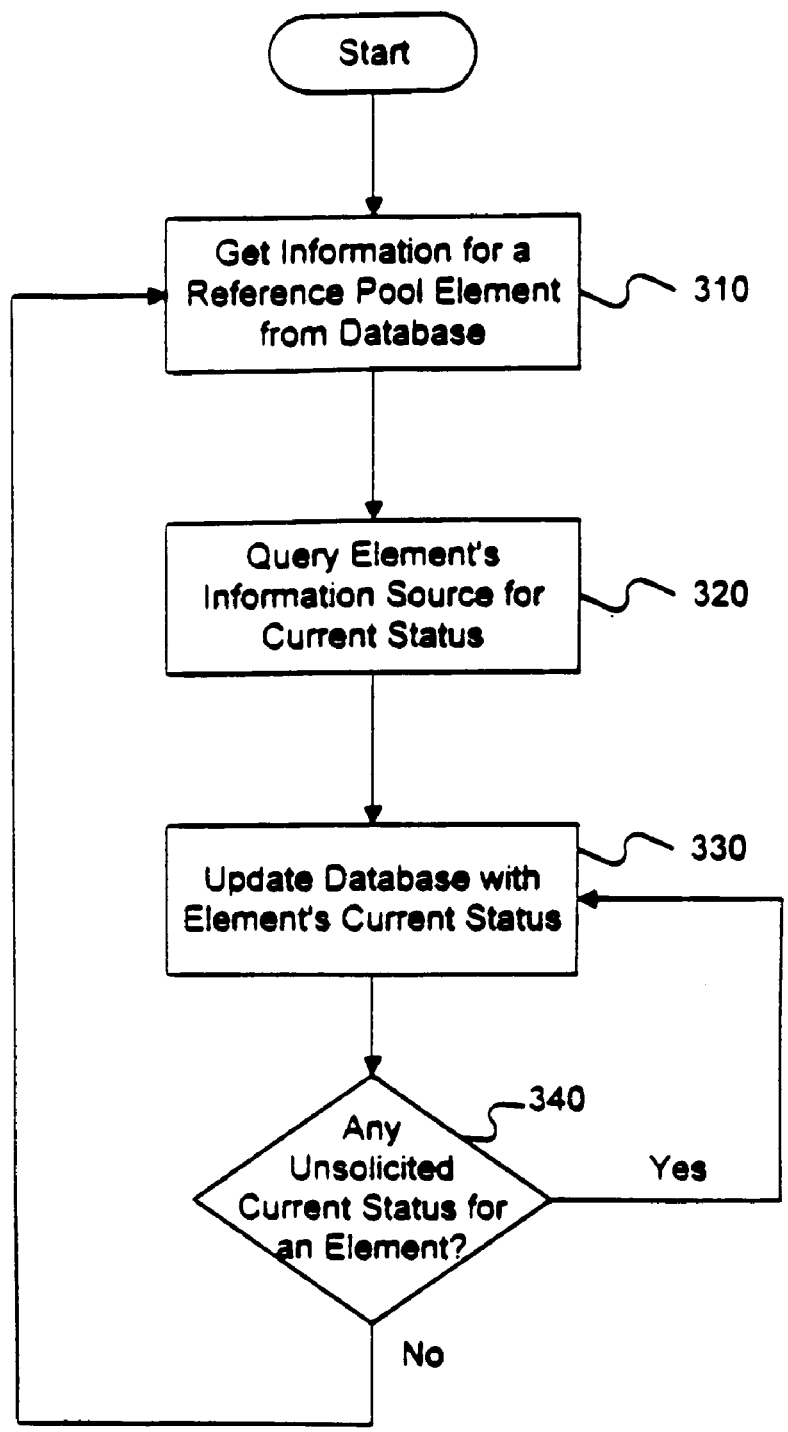
FIG. 3 is an exemplary flowchart of the steps performed by the monitoring component of a Guarantee Certificate system, consistent with the principles of the present invention.

A monitoring component 220 queries and takes input from agents that monitor the ongoing status or performance of each element in the Reference Pool, with particular emphasis on status changes that constitute triggering events for purposes of the payment function. FIG. 3 is an exemplary flowchart of the steps performed by a monitoring component of a Guarantee Certificate system, consistent with the principles of the present invention.

As shown in FIG. 3, the first step of the process gets information concerning a Reference Pool element from database 210 (step 310). The information includes the identity of a status information source for the element. The status information source is anything that can supply current status regarding the element, such as a person, a computer system such as host 124, or a database hosted on a computer system such as server 130. In the case of a Reference Pool of mortgages, the status information source is typically a mortgage servicer or other person who monitors loan status or performance.

Next, monitoring component 220 queries the Reference Pool element's information source for the current status of the element (step 320). In the case of a human information source, querying typically involves generating a written message requesting information, such as a letter or email message. In the case of an automated information source, querying typically involves an electronic service request sent across network 122, or an electronic query to a database.

When an element's current status information is received in response to the query, monitoring component 220 records the information in database 210 (step 330). For a non-electronic response, such as a letter from a person, recording the current status information in database 210 typically involves manually entering the information using input device 114. For an automated response, such as the electronic results of a query to a remote database, recording typically involves automatically saving the information in database 210.

In step 340, if current status information for a Reference Pool element arrives unsolicited (i.e., not in response to a monitoring component query), then monitoring component 220 updates database 210 with the current status (step 330). If there is no unsolicited current status information to process, then the monitoring component process returns to step 310 to process another Reference Pool element.

(3) Reporting Component

Reporting component 230 allows ad hoc or standard queries to database 210 and generates electronic or printed reports. In the case of a Reference Pool of mortgages, this component queries database 210 and reports on payment status, delinquent status or any other attribute either for individual loans or in the aggregate. Reporting component 230 also provides information about one or more Guarantee Certificates, including descriptive information and the history of certificate holder payments made.

(4) Certificate Payment Component

Figure 4:
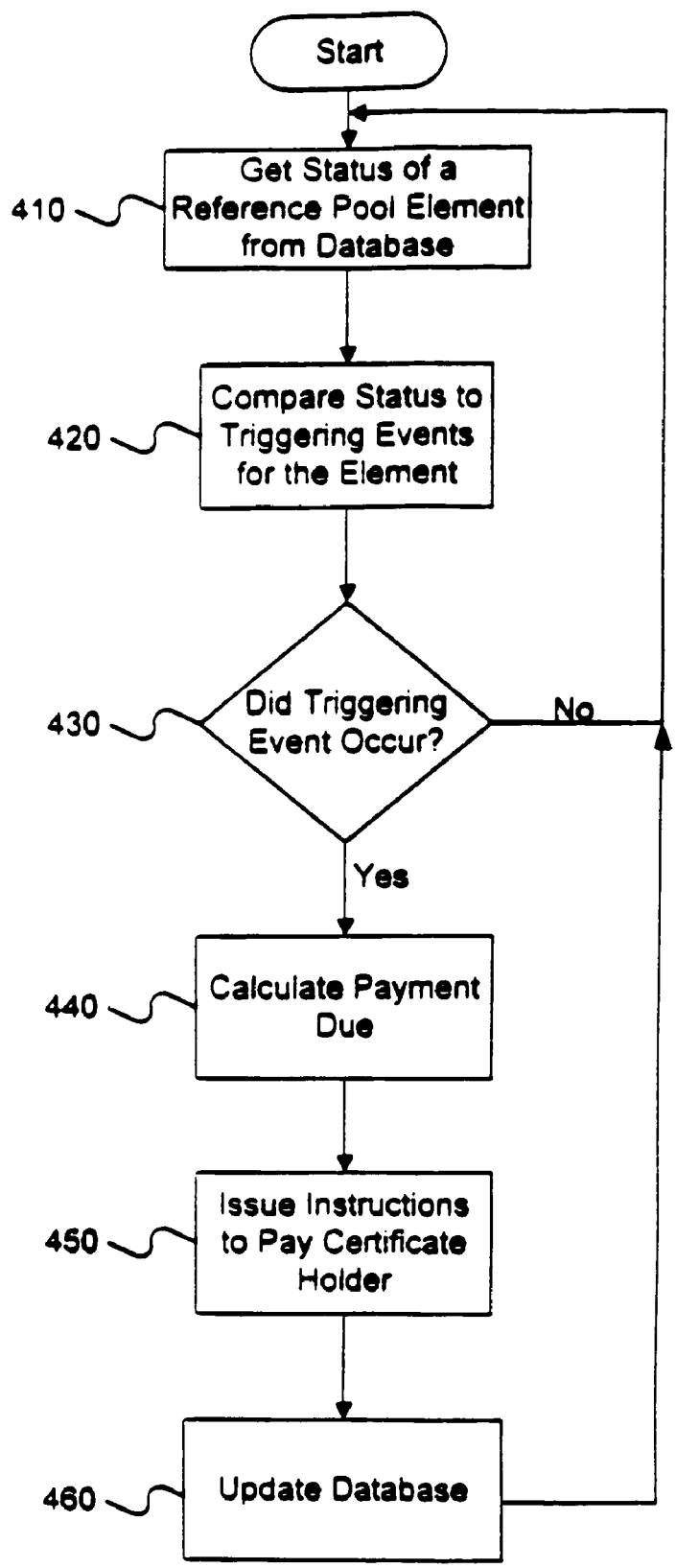
FIG. 4 is a flowchart of the steps performed by the certificate payment component of a Guarantee Certificate system, consistent with the principles of the present invention.

Certificate payment component 240 stores the definition of events that trigger payments to Guarantee Certificate holders, identifies when triggering events occur, calculates any payments due, and issues instructions to pay Certificate holders. FIG. 4 is an exemplary flowchart of the steps performed by the certificate payment component of a Guarantee Certificate system, consistent with the principles of the present invention.

As shown in FIG. 4, the first step of the process gets the status information of a Reference Pool element from database 210 (step 410). In the case of a Reference Pool of mortgages, payment component 240 keeps a list of the loans in database 210 belonging to the pool and gets the status information of each of them.

Next, payment component 240 compares the status information to the triggering event or events for the Reference Pool element (step 420). Payment component 240 keeps a definition of each triggering event for a Guarantee Certificate, such as reaching the status of a specified number of days delinquent, loan foreclosure, property liquidation or another event monitored or recorded by the system. If the triggering event did not occur (step 430; No), then payment component 240 returns to step 410 to process another Reference Pool element. If the triggering event occurred (step 430, Yes), then the process moves to step 440.

In step 440, payment component 240 calculates the payment due for the triggering event. The calculation can involve any mathematical formula related or unrelated to any variable measured by the system. For example, the payment can be a straight dollar-for-dollar pass-through of the insurance or guarantee payment, or a fixed percentage of the insurance or guarantee payment, or some other amount based on a formula. Next, payment component 240 issues instructions to pay the Certificate holder or holders (step 450). This typically involves sending an electronic or printed notice to the paying agent for the Guarantee Certificate in question.

Payment component 240 then updates database 210 regarding the payment made to the Guarantee Certificate holder (step 460), and returns to step 410 to process another Reference Pool element.

One of ordinary skill in the art will recognize that many modifications can be made to the components and steps described without departing from the principles of the present invention. For example, monitoring component 220 and reporting component 230 could be combined into a single component that performs the functions of both.

Issuing Process

Figure 5:
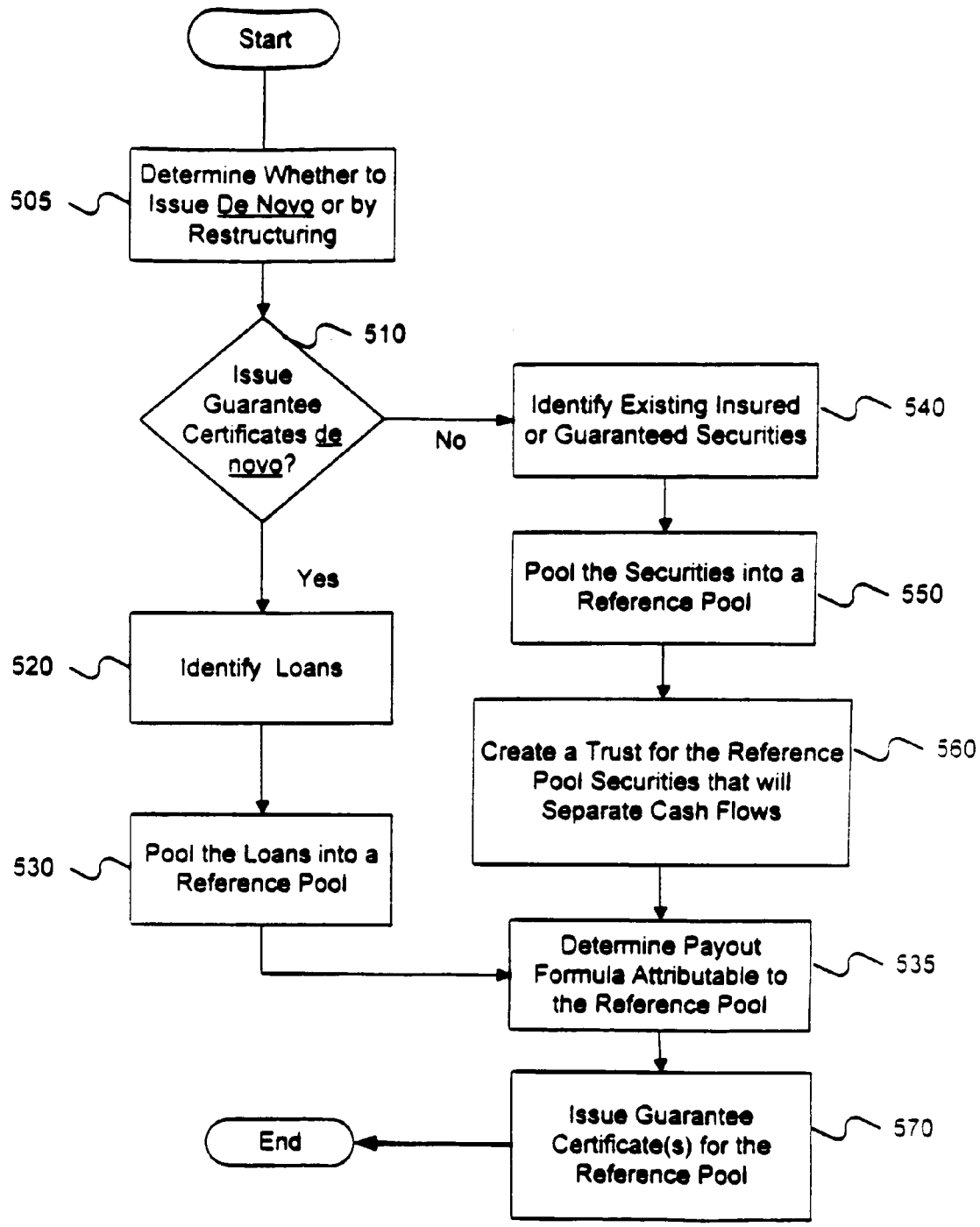
FIG. 5 is a flowchart of steps for issuing a Guarantee Certificate, consistent with the principles of the present invention.

Issuers can create Guarantee Certificates either by restructuring the cash flows from existing insurance or guarantee arrangements, or by issuing the certificates de novo. FIG. 5 is an exemplary flowchart of the steps for issuing a Guarantee Certificate, consistent with the principles of the present invention.

As shown in FIG. 5, the issuer first determines whether to issue a Guarantee Certificate de novo, or by restructuring existing financial obligations (step 505). If, at step 510, the issuer decides to issue de novo Guarantee Certificates, the issuer identifies or specifies a set of loans (which may or may not be securitized) (step 520), and pools the loans into a Reference Pool (step 530).

The issuer then determines a payout formula attributable to the Reference Pool (step 535). For de novo Guarantee Certificates, the Reference Pool merely acts as an index and no cash flows attributable to the loans in the Pool are used to satisfy the de novo Guarantee Certificate payout formula obligation.

In one preferred embodiment, the issuer determines the payout formula by analyzing the behavior of the Reference Pool relative to a separate loan pool. For example, a de novo issuer of Guarantee Certificates for a pool of manufactured-housing loans may model the manufactured-housing loan Reference Pool relative to the performance of a single-family-housing loan pool. Even if the issuer is not familiar with the performance of the manufactured-housing pool, by comparing it against the familiar single-family-housing pool, the issuer can determine a payout formula that reflects the differences between the two. For example, if the delinquency rate of manufactured-housing loans is twice that of single-family-housing loan, then the issuer could make the manufactured-housing loan pool Guarantee Certificate payout formula (on a per loan basis) one-half of the formula used for a single-family housing loan pool.

In step 570, the issuer issues Guarantee Certificate(s) entitled to receive cash flows specified by the payout formula and triggered by specified events or conditions in the Reference Pool.

If the issuer decides not to issue de novo Guarantee Certificates (step 510), then the issuer can restructure existing financial obligations to issue Guarantee Certificates. For a restructuring issue, the issuer identifies existing loans and/or securities already insured or guaranteed (step 540) and pools the loans and/or securities into a Reference Pool (step 550). In contrast to de novo issuance, the cash flows used to satisfy any Guarantee Certificate obligation come from the securities in the Reference Pool.

In forming the Reference Pool, the issuer may choose loans or securities based upon the perceived risk associated with each, the potential make-whole payment associated with each, or other factors. Pooling involves forming the loans and/or securities into an identified group. The Reference Pool may be static or dynamic. With static Reference Pools, the loans are identified when the Reference Pool is created and cannot be changed. With dynamic pools, loans can be added or removed according to a pre-specified eligibility rule. For example, an eligibility rule might be loans purchased by a specified entity having specific characteristics such as loan size or type. Dynamic pools can be used to hedge an active portfolio by reducing the need to continually adjust the hedge as new loans are added to the portfolio.

Next, the issuer creates a trust to hold the Reference Pool loans or securities (step 560). The trust obligates the trustee to identify and segregate the cash flows paid to satisfy insurance or guarantee claims from the cash flows normally paid by the underlying loans or securities. Guarantee Certificates are then issued based on the trust created by the issuer. Each Guarantee Certificate is entitled to receive a specified schedule of the insurance or guarantee payments (step 570). The payments can be a straight dollar-for-dollar pass-through of the insurance or guaranty payments, or can be determined by a formula based on the payments.

When a Guarantee Certificate is issued, the term (time period) of a Guarantee Certificate may vary from the terms of the loans in the Reference Pool. The Guarantee Certificate period may be longer or shorter than the terms of the pool elements. For example, the Reference Pool may contain 30-year mortgages exclusively, yet the issuer may issue a Guarantee Certificate with a term or 10 years or with a term of 40 years.

Figure 6:
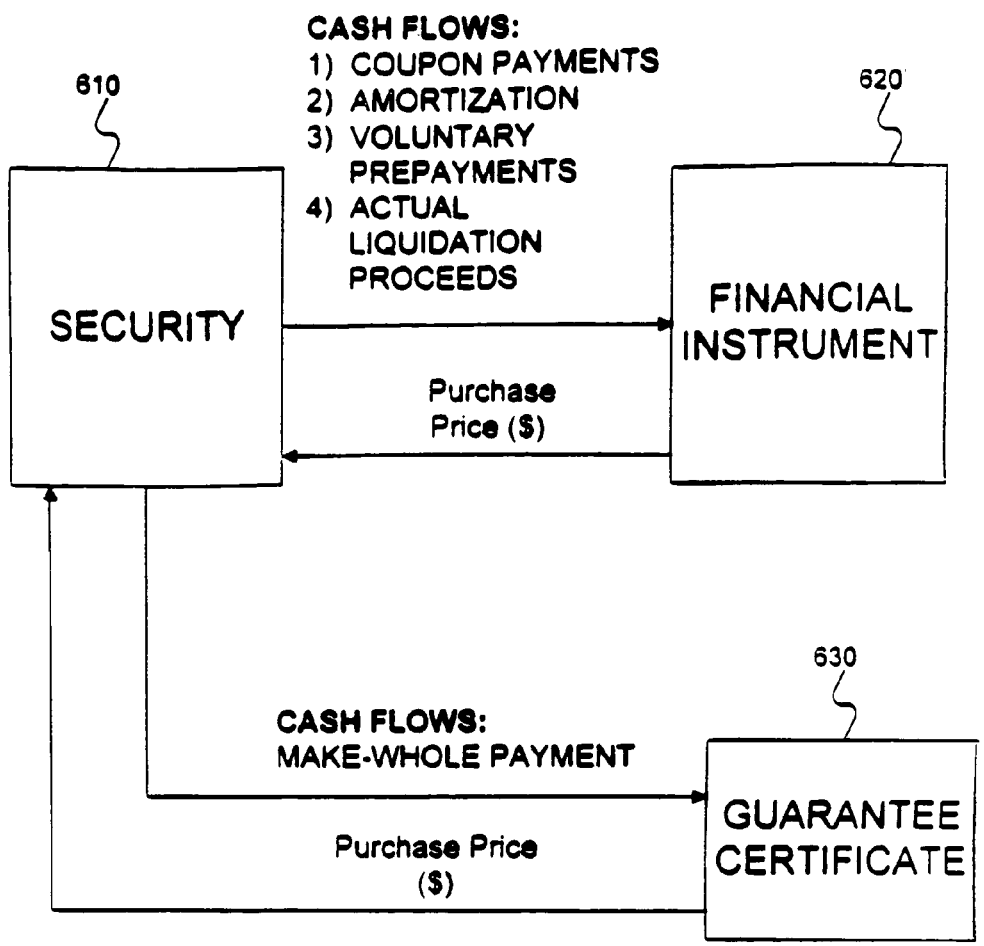
FIG. 6 is a block diagram illustrating the process of restructuring cash flows from existing guarantee arrangements to issue Guarantee Certificates, in accordance with the principles of the present invention.

FIG. 6 further illustrates one way in which cash flows from existing guarantee arrangements, such as insured loans, can be restructured to issue Guarantee Certificates in accordance with one aspect of the present invention. As shown in FIG. 6, security 610 represents a set of investments, for example, a Reference Pool of loans. Associated with security 610 is a traditional financial instrument 620 and a Guarantee Certificate 630. In exchange for the purchase price, the holder of financial instrument 620, which may be a bond or other instrument evidencing a guarantee obligation, receives all cash flows traditionally associated with the guarantee obligation. For example, in the case illustrated of a mortgage loan, the holder of financial instrument 620 receives payments in the forms of: all regular interest payments (shown as coupon payments), amortization benefits, voluntary prepayments, and the actual liquidation proceeds if the collateral underlying security 610 is sold. The holder of Guarantee Certificate 630, on the other hand, receives a cash flow in the form of a make-whole payment only if the collateral underlying security 610 is liquidated. A make-whole payment is the difference between the full value of security 610 and the actual liquidation proceeds. Thus, the full (100%) value of security 610 is equal to the combination of the make-whole payment and the actual liquidation proceeds. By dividing the cash flows of an existing security 610 as described, an issuer can create, issue, and manage a Guarantee Certificate 630.

It is important to note that, in this example, the buyer of Guarantee Certificate 630 pays security 610 holder for a contingent interest in the make-whole payment, not a certain interest. The make-whole payment of an insured mortgage loan, for example, is generated only if the underlying security for the loan (i.e., the real estate) is sold. Typically, real estate is liquidated only when a mortgage loan is in default. Thus, the holder of Guarantee Certificate 630 receives a make-whole payment only if the mortgage loan borrower defaults and the mortgage holder liquidates the underlying real estate. The make-whole payment also could be triggered by an event other than a real estate liquidation, such as, for example, a 30-day delinquency or foreclosure.

The purchase price sum paid to the issuer for the contingent interest of Guarantee Certificate 630 may be set at a value relative to the particular security, or it may be determined by auction. For example, a security with an extremely low likelihood of default may demand a very low amount for the corresponding Guarantee Certificate. If, however, there is a high likelihood of default, a buyer may be willing to pay a higher amount for the Guarantee Certificate. Whether or not the issuer has restricted or eliminated the buyers ability to trade a Guarantee Certificate after issuance will also affect the initial price. After initial issuance, the price a subsequent buyer is willing to pay for a tradable Guarantee Certificate will be determined by various market factors, including the default history in the Reference Pool, and projections of the subsequent likelihood of default within the pool.

One skilled in the art will recognize that amounts of the cash flows and the types of triggering events can be varied without departing from the principles of the present invention. For example, instead of liquidation, the cash flows to the Guarantee Certificate holder could be triggered by a payment delinquency event, such as a 180-day payment delinquency, a foreclosure event, or the classification of a property as Real Estate Owned (REO). For another example, instead of the entire make-whole payment, the cash flows to the Guarantee Certificate holder could be structured to be a fraction of the make-whole payment.

Figure 7:
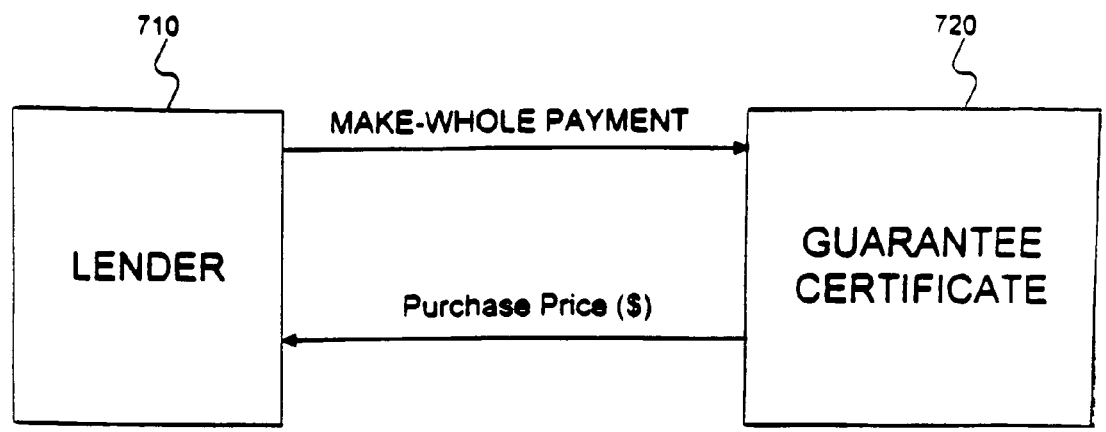
FIG. 7 is a block diagram illustrating the payment process associated with a de novo issuance of Guarantee Certificates, in accordance with the principles of the present invention.

FIG. 7 is a block diagram illustrating the payment process associated with an issuance of de novo Guarantee Certificates associated with a Reference Pool in accordance with the principles of the present invention. As shown in FIG. 7, a lender 710 issues a Guarantee Certificates 720, which is associated with a security or Reference Pool, to an entity in exchange for a sum of money. Guarantee Certificate 720 entitles the entity, or other holder in due course, to receive make-whole payments should, for example, the underlying property be sold. The make-whole payment is the difference between the full value of the security or pool and the actual liquidation proceeds. The make-whole payment also could be triggered by an event other than a real estate liquidation, such as, for example, a 30-day delinquency or foreclosure.

Reference Pools as Credit Enhancements

Like Guarantee Certificates, Reference Pools may be used as credit enhancements that serve as hedges for sharing risk of loss on loan investments. For example, a seller may wish to sell a pool of loans (the "Subject Pool") to a buyer, but the buyer may be reluctant to purchase such loans because of a lack of information to determine a default risk factor for such loans. In order to overcome this uncertainty, the buyer and seller may enter into a risk-sharing arrangement in connection with the transaction.

In such an arrangement, the parties may agree that for a specified period of time, the performance of loans in the Subject Pool may be monitored along with comparable loans in a Reference Pool. For example, the parties may agree to a performance monitoring term of ten years. The Reference Pool may include loans having comparable attributes that match those of loans in the Subject Pool. The composition of the Reference Pool will be described below in detail.

The parties may further agree that at the end of one or more predetermined payment cycles, the performance of the two pools are compared, and based on an agreed upon payment formula, a payment due is determined for one party to make to the other to hedge risk of loss in connection with the transaction. The parties may agree to a performance measure for comparing the performance of the two pools. The performance measure may include, for example, a comparison of cumulative dollar losses in the Subject Pool and the Reference Pool, default frequencies, delinquency rates, or any other indicator of performance.

The parties may agree that the predetermined payment cycle may occur on a periodic basis, such as an annual basis, semi-annual basis, quarterly basis, monthly basis, weekly basis, etc. The payment formula may include a formula that specifies one or more rules for calculating a payment due to one party by the other party. In addition, the payment formula may include one or more payment conditions that trigger the time for one party to make payment to the other.

Adjustments may be made to the Reference Pool when a change occurs to the composition of the Reference Pool or the Subject Pool. For example, dollar losses in the Reference Pool may be adjusted for differences in the size of the pools due to, for example, prepayment of loans in either the Reference Pool or the Subject Pool. Such adjustments may be made to ensure comparability of the two pools.

Figure 8:
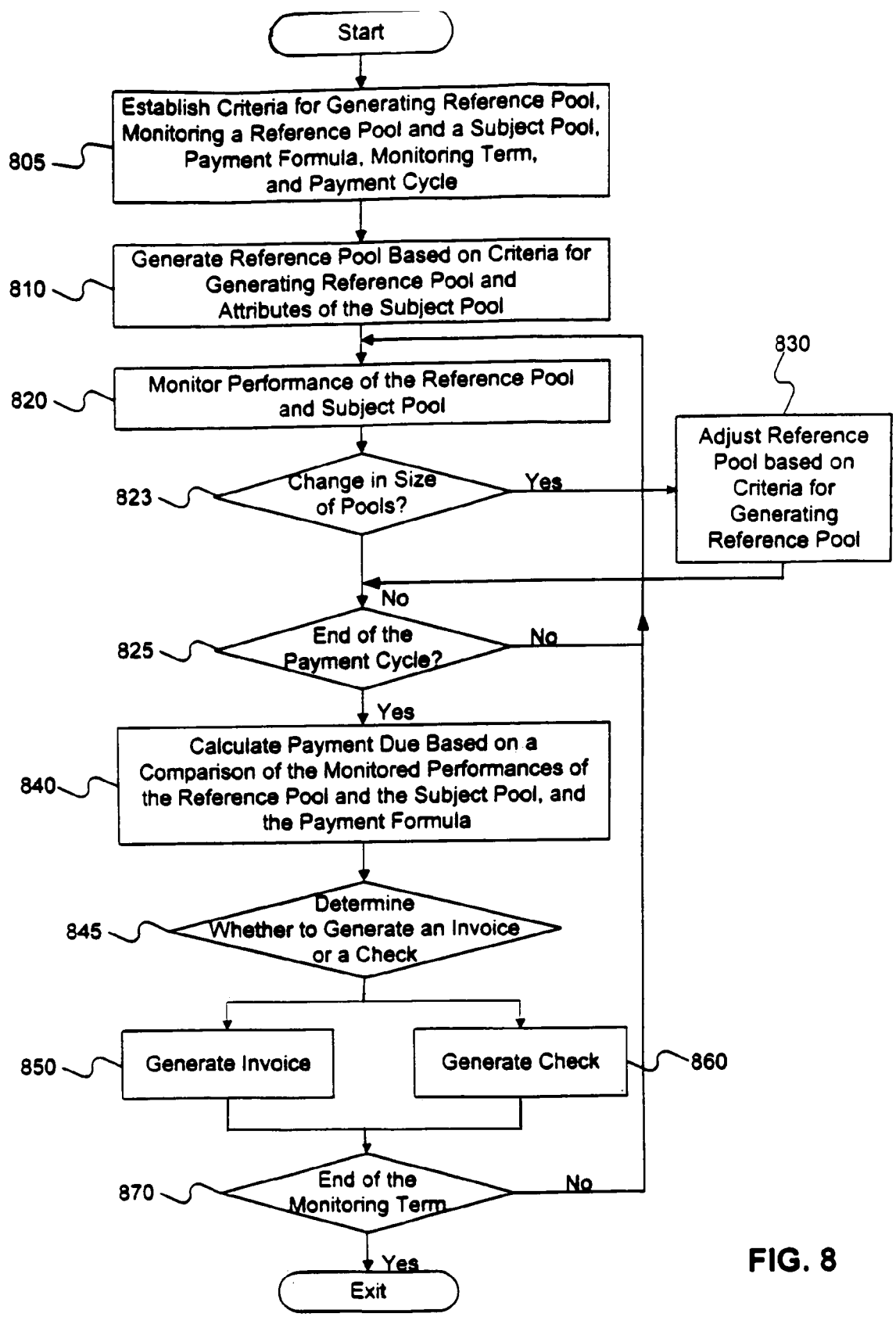
FIG. 8 is an exemplary flowchart of a method for using a Reference Pool as a credit enhancement for hedging risk of loss on loan investments, consistent with the principles of the present invention.

An embodiment of the present invention provides for using Reference Pools to hedge risk of loss in loan investments as described above. FIG. 8 is an exemplary flowchart of a method for using a Reference Pool as a credit enhancement for hedging risk of loss on loan investments, consistent with the principles of the present invention. As shown in FIG. 8, the parties may establish criteria for hedging risk of loss, such as criteria for generating a Reference Pool, a performance measure, a payment formula, a term for monitoring the performance of the loans in the Reference Pool and Subject Pool, and a payment cycle (stage 805). For example, the parties may stipulate a term of ten years for monitoring performance of the loans in the two pools. Further, the parties may agree to an annual payment cycle basis. The criteria for generating a Reference Pool may include the relative size of the Reference Pool in relation to the Subject Pool, for example, the Reference Pool may be two times the Size of the Subject Pool.

(1) Creation of a Reference Pool

A Reference Pool of loans may be created based on the criteria for generating the Reference Pool and attributes of the loans in the Subject Pool. The parties may agree on the selection of the attributes in the Subject pool (i.e., comparable attributes) that may be used to identify loans that may be included in the Reference Pool. The comparable attributes may include, for example, one or more of the following: number of loans, average dollar amount of the loans, loan origination date, geographical location of the property securing the loan, a borrower's credit rating score (e.g., a Fair Isaacs ("FICO") score), a loan to value ratio ("LTV"), a borrower's payment history, and type of loan (stage 810). The type of loan may include, for example, adjustable rate loans, adjustable rate mortgage loans (ARMs), fixed rate loans, etc.

To create the Reference Pool of loans, system 100 or a loan administrator may identify existing loans in database 210 having attributes that match the comparable attributes of the loans in the Subject Pool. The identified loans may or may not include loans that were previously owned by the seller.

System 100 or the loan administrator may populate the Reference Pool with the identified loans until the relative number of loans in the Reference Pool is reached, based on the criteria for generating the Reference Pool. For example, the criteria for generating the Reference Pool may specify that the relative number of loans in the Reference Pool may include twice the number of loans in the Subject Pool. If the Subject Pool includes 10,000 loans, the Reference Pool may include 20,000 loans and may have a number of loans ratio of 2:1 to the Subject Pool. The payment formula may include a multiplier for the number of loans ratio, which in this example is 1/2.

Alternatively, the parties may have stipulated that the total dollar amount of the UPB of the Reference Pool may be established at two times the total dollar amount of the UPB of the Subject Pool. For example, the total dollar amount of the UPB of the Subject Pool may be $100,000,000 and the total dollar amount of the UPB of the Reference Pool may be $200,000,000.

(2) Monitoring of the Reference Pool

After the Reference Pool is generated, monitoring component 220 may monitor performance of the Reference Pool and Subject Pool for the stipulated term; in this example the term is ten years (stage 820). Monitoring component 220 may store information about the monitored performance in database 210.

(3) Adjustments to the Reference Pool

Adjustments may be made to the Reference Pool when a change occurs to the composition of the Reference Pool or the Subject Pool. In this example, assume that the criteria for generating the Reference Pool specifies a relative number of loans in the Reference Pool as two times the number of loans in the Subject Pool. If a change occurs in the number of loans in the Subject Pool or the Reference Pool (stage 823), monitoring component 220 may adjust the number of loans in the Reference Pool (stage 830). For example, an adjustment may be made to the Reference Pool due to prepayment of one or more loans in the Subject Pool and/or Reference Pool. The adjustment may include deleting and/or adding one or more loans in the Reference Pool to maintain the relative number of loans in the two pools.

In an alternate example, assume that the criteria for generating the Reference Pool specifies a relative dollar amount of the UPB of the Reference Pool at two times the total dollar amount of the UPB of the Subject Pool, such that the UPB of the Reference Pool is $200,000,000 while the UPB of the Subject Pool is $100,000,000. If a change occurs in the number of loans in the Subject Pool or the Reference Pool (stage 823), monitoring component 220 may adjust the number of loans in the Reference Pool (stage 830). For example, an adjustment may be made due to prepayment of one or more loans in the Subject Pool and/or Reference Pool. The adjustment to the Reference Pool may include deleting and/or adding one or more loans in the Reference Pool to maintain the relative UPB size of the two pools.

Those of ordinary skill in the art will recognize that other adjustments may be made to the Reference Pool due to a change in composition of the Reference Pool and/or the Subject Pool.

(4) Determining a Payment Due to a Party by the Other Party

Monitoring component 220 may determine whether the end of the payment cycle is reached, such as the end of a year (stage 825). If the end of the payment cycle is not reached ("No"), monitoring of the Reference Pool and the Subject Pool continues (stage 820). Otherwise ("Yes"), payment component 240 may calculate a payment due based on a comparison of the monitored performances of the loans in the Reference Pool and Subject Pool, and the payment formula (stage 840). In this example, assume that the parties have agreed on a payment measure specifying that dollar losses in the two pools are to be compared. Further, assume that the parties have agreed to a payment formula that provides for calculating a payment due based on a dollar-for-dollar loss difference between the two pools. Also assume that at the beginning of the first year the Subject Pool has 10,000 loans and the Reference Pool has 20,000 loans. Now assume that in year one the Subject Pool has $50,000 in losses, and that the Reference Pool has $180,000 in losses. In this example, to find the relative dollar loss for the Reference Pool the $180,000 may be multiplied by 1/2 to get a value of $90,000. The dollar loss between the two pools may now be computed to get a value of $40,000 (i.e., 90,000–50,000); thus, the payment due is $40,000. In calculating the payment due, payment component 240 may take into account any settle-up payments made by the parties.

In another example, assume that the parties have agreed on a payment measure specifying that actual dollar losses in the two pools are to be compared. Further, assume that the parties have agreed to a payment formula that provides for calculating a payment due based on fixed percentage, in this example, 75% of the actual dollar loss difference between the two pools. Also assume that at the beginning of the first year the Subject Pool has 10,000 loans and the Reference Pool has 30,000 loans. Now assume that in year one the Subject Pool has $50,000 in losses, and the Reference Pool has $180,000 in losses. In this example, to find the relative dollar loss for the Reference Pool the $180,000 may be multiplied by 1/3 to get a value of $60,000. The actual loss difference between the two pools may now be computed to get a value of $10,000 (i.e., 60,000–50,000). The payment due to the seller is 75% times $10,000, which equals $7,500.

In yet another example, assume that the parties have agreed on a payment measure specifying that dollar losses in the two pools are to be compared. Further, assume that the parties have agreed to a payment formula that provides for calculating a payment due based on a dollar-for-dollar loss difference between the two pools. Also assume that at the beginning of the first year the Subject Pool has a UPB of $15,000,000 and the Reference Pool has a UPB of $45,000,000. Accordingly, the UPB ratio of the Reference Pool to the Subject Pool is 3:1, and the multiplier for the payment formula is 1/3.

Now assume that at the end of year one $5,000,000 UPB have been prepaid in the Subject Pool, such that the Subject Pool contains a UPB of $10,000,000. Also assume that at the end of year one $5,000,000 UPB have been prepaid in the Reference Pool, such that the Reference Pool contains a UPB of $40,000,000. The ratio of the Reference Pool to the Subject Pool at the end of year 1 is 4:1. The multiplier for the payment formula may be adjusted to take into account the change in the composition of the two pools, such that the multiplier becomes 1/4 instead of 1/3. Now assume that at the end of year one the Subject Pool has $50,000 in losses, and the Reference Pool has $160,000 in losses In this example, to find the relative dollar loss for the Reference Pool the $160,000 may be multiplied by 1/4 to get a value of $40,000. The dollar loss between the two pools may now be computed to get a value of $10,000 (i.e., 50,000–40,000); thus, the payment due to the buyer is $10,000.

In another example, assume that the parties have agreed on a payment measure specifying that the number of defaults in the Subject Pool and Reference Pool are to be compared. Also assume that the parties have agreed to a payment formula that provides for calculating a $100 payment for each default difference between the two pools. In addition, assume that at the beginning of the first year the Subject Pool has 10,000 loans and the Reference Pool has 30,000 loans. Now assume that in year one the Subject Pool has 500 defaults, and the Reference Pool has 900 defaults. To find the relative defaults for the Reference Pool the 900 may be multiplied by 1/3 to get a value of 300 defaults. In this example, the Subject Pool has 200 more defaults than the Reference Pool (i.e., 500–300). The payment due to the buyer may now be computed to get a value of $20,000 (i.e., $100 times 200).

(5) Determining Whether to Generate an Invoice or a Payment Form

Payment component 240 may determine to which party the payment is due, and whether to generate an invoice or a payment form, such as a check or a request for an electronic transfer of funds (stage 845). For example, if the performance of the Reference Pool is inferior to the performance of the Subject Pool, payment component 240 may generate a check on behalf of the buyer for payment to the seller in the amount of the payment due (stage 860). However, if the performance of the Subject Pool is inferior to the performance of the Reference Pool, payment component 240 may generate an invoice instructing the seller to make payment to the buyer in the amount of the payment due (stage 850).

If the payment formula includes a payment condition that triggers the time for one party to make payment to the other, payment component 240 may issue the check or invoice once the payment condition is triggered. For example, the payment formula may include a payment condition that is triggered when there is a difference of at least $25,000 in cumulative losses between the Subject Pool and the Reference Pool. If the Payment Conditions is satisfied, system 100 may issue the check or invoice as described above.

Finally, system 100 may determine whether the end of the term for monitoring the performance of the two pools is reached (stage 870). If the end of the term for monitoring is reached ("Yes"), monitoring of the Reference Pool and Subject Pool ends. Otherwise ("No"), monitoring component 220 resumes monitoring of the Reference Pool and Subject Pool (stage 820).

CONCLUSION

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for hedging risk of loss on loan investments based on established criteria for hedging the risk of loss on the loan investments, including a payment formula and a payment cycle, the method comprising:
   monitoring, during a predefined period of time and using at least one data processing system, an indirect performance indicator of a first pool of loans and an indirect performance indicator of a second pool of loans;
   comparing, using at least one data processing system, the monitored indirect performance indicator of the first pool of loans and the monitored indirect performance indicator of the second pool of loans;
   calculating, using at least one data processing system, a payment due based on the comparison of the monitored indirect performance indicator of the first pool of loans and the monitored indirect performance indicator of the second pool of loans, and the payment formula; and
   making available, using at least one data processing system, an indication of the payment due at the end of the payment cycle,
   wherein the first pool of loans and the second pool of loans are two different pools of loans.

2. The method of claim 1, wherein the indirect performance indicator of the first pool of loans is a cumulative number of defaults during the payment cycle.

3. The method of claim 1, wherein the indirect performance indicator of the first pool of loans is a cumulative amount of losses during the payment cycle.

4. The method of claim 1, wherein the indirect performance indicator of the first pool of loans is a default frequency rate.

5. The method of claim 1, wherein the indirect performance indicator of the first pool of loans is a delinquency rate.

6. A computer readable medium containing instructions for controlling a computer system to perform a method for hedging risk of loss on loan investments based on established criteria for hedging the risk of loss on the loan investments, including a payment formula and a payment cycle, the method comprising:
   monitoring, during a predefined period of time, an indirect performance indicator of a first pool of loans and an indirect performance indicator of a second pool of loans;
   comparing the monitored indirect performance indicator of the first pool of loans and the monitored indirect performance indicator of the second pool of loans;
   calculating a payment due based on the comparison of the monitored indirect performance indicator of the first pool of loans and the monitored indirect performance indicator of the second pool of loans, and the payment formula; and making available an indication of the payment due at the end of the payment cycle, wherein the first pool of loans and the second pool of loans are two different pools of loans.

7. A computer program product comprising:

a computer usable medium having computer readable instructions embodied therein for enabling a process for hedging risk of loss on loan investments based on established criteria for hedging the risk of loss on the loan investments, including a payment formula and a payment cycle, the computer usable medium comprising:

means for monitoring, during a predefined period of time, an indirect performance indicator of a first pool of loans and an indirect performance indicator of a second pool of loans;

means for comparing the monitored indirect performance indicator of the first pool of loans and the monitored indirect performance indicator of the second pool of loans;

means for calculating a payment due based on the comparison of the monitored indirect performance indicator of the first pool of loans and the monitored indirect performance indicator of the second pool of loans, and the payment formula, wherein the first pool of loans and the second pool of loans are two different pools of loans.

8. The computer program product of claim 7, wherein the indirect performance indicator of the first pool of loans is a cumulative number of defaults during the payment cycle.

9. The computer program product of claim 7, wherein the indirect performance indicator of the first pool of loans is a cumulative amount of losses during the payment cycle.

10. The computer program product of claim 7, wherein the indirect performance indicator of the first pool of loans is a default frequency rate.

11. The computer program product of claim 7, wherein the indirect performance indicator of the first pool of loans is a delinquency rate.

12. A system for hedging risk of loss on loan investments based on established criteria for hedging the risk of loss on the loan investments, including a payment formula and a payment cycle, the system comprising:

a processor; and a memory in communication with the processor and storing a program component containing instructions, wherein the processor is operative with the program component to monitor, during a predefined period of time, an indirect performance indicator of a first pool of loans and an indirect performance indicator of a second pool of loans;

compare the monitored indirect performance indicator of the first pool of loans and the monitored indirect performance indicator of the second pool of loans;

calculate a payment due based on the comparison of the monitored indirect performance indicator of the first pool of loans and the monitored indirect performance indicator of the second pool of loans, and the payment formula; and output the payment due at the end of the payment cycle, wherein the first pool of loans and the second pool of loans are two different pools of loans.

13. A method for hedging risk of loss on loan investments based on established criteria for hedging the risk of loss on the loan investments, including a payment formula and a payment cycle, the method comprising:

monitoring, during a predefined period of time and using at least one data processing system, at least one attribute of a first pool of loans from a group comprising: a cash flow for the first pool of loans, a dollar loss during a payment cycle for the first pool of loans, a loss frequency for the first pool of loans, a default frequency rate for the first pool of loans, a delinquency rate for the first pool of loans, a number of defaults for the first pool of loans, a principal balance for the first pool of loans, a coupon history for the first pool of loans, a payment history for the first pool of loans, and a borrowers' credit history for the first pool of loans;

monitoring, during the predefined period of time and using the at least one data processing system, at least one attribute of a second pool of loans from a group comprising: a cash flow for the second pool of loans, a dollar loss during a payment cycle for the second pool of loans, a dollar loss frequency for the second pool of loans, a default frequency rate for the second pool of loans, a delinquency rate for the second pool of loans, a number of defaults for the second pool of loans, a principal balance for the second pool of loans, a coupon history for the second pool of loans, a payment history for the second pool of loans, and a borrowers' credit history for the second pool of loans;

comparing, using the at least one data processing system, the monitored attribute of the first pool and the monitored attribute of the second pool;

calculating, using the at least one data processing system, a payment due based on the comparison of the monitored attribute of the first pool and the monitored attribute of the second pool, and the payment formula; and making available, using the at least one data processing system, an indication of the payment due at the end of the payment cycle, wherein the first pool of loans and the second pool of loans are two different pools of loans.

14. The method of claim 13, further comprising:

generating the first pool based on comparable attributes of the second pool.

15. The method of claim 14, wherein the comparable attributes of the second pool includes one or more of the following: number of loans in the second pool, an average dollar amount of the loans in the second pool, a loan origination date, a geographical location, a credit rating score, a loan to value ratio ("LTV"), a payment history, a type of loan.

16. The method of claim 13, further comprising:

adjusting the first pool based on a change in a number of loans in the second pool.

17. The method of claim 16, wherein the first pool is adjusted by adding or removing loans from the first pool based on the change in the number of loans in the second pool.

18. The method of claim 13, further comprising:

adjusting the first pool based on a change in a total dollar amount of unpaid principal balance ("UPB") on loans in the second pool.

19. The method of claim 18, wherein the first pool is adjusted by adding or removing loans from the first pool based on the total dollar amount of UPB on loans in the second pool.

20. The method of claim 13, wherein the payment cycle comprises one of the following: an annual basis, a semi-annual basis, a quarterly basis, a monthly basis, or a weekly basis.

21. The method of claim 13, wherein the payment formula includes a formula for determining losses in the first pool and the second pool.

22. The method of claim 21, wherein the payment formula further includes adjustments for determining losses in the first pool if a change occurs to a number of loans in the second pool or a change occurs in a total dollar amount of unpaid principal balance ("UPB") on loans in the second pool.

23. The method of claim 13, wherein calculating a payment due comprises:
   determining the payment due to a first party or a second party based on the difference in the performance of the first pool and the second pool.

24. The method of claim 23, wherein the first party includes a buyer of the second pool and the second party includes a seller of the second pool.

25. The method of claim 13, further comprising:
   generating an invoice or a payment form based on the calculated payment due, for hedging a loss related to a difference in compared performance between the first pool and the second pool.

26. The method of claim 25, wherein generating an invoice or a payment form based on the calculated payment due, comprises:
   generating the payment form for the payment due if the compared performance of the first pool is inferior to the performance of the second pool; otherwise,
   generating the invoice for the payment due if the compared performance of the second pool is inferior to the performance of the first pool.

27. The method of claim 13, wherein calculation of the payment due occurs at the triggering of one or more payment conditions.

28. A computer readable medium containing instructions for controlling a computer system to perform a method for hedging risk of loss on loan investments based on established criteria for hedging the risk of loss on the loan investments, including a payment formula and a payment cycle, the method comprising:
   monitoring, during a predefined period of time, at least one attribute for a first pool of loans from a group comprising: a cash flow for the first pool of loans, a dollar loss during a payment cycle for the first pool of loans, a dollar loss frequency for the first pool of loans, a default frequency rate for the first pool of loans, a delinquency rate for the first pool of loans, a number of defaults for the first pool of loans, a principal balance for the first pool of loans, a coupon history for the first pool of loans, a payment history for the first pool of loans, and a borrowers' credit history for the first pool of loans;
   monitoring, during the predefined period of time, at least one attribute for a second pool of loans from a group comprising: a cash flow for the second pool of loans, a dollar loss during a payment cycle for the second pool of loans, a dollar loss frequency for the second pool of loans, a default frequency rate for the second pool of loans, a delinquency rate for the second pool of loans, a number of defaults for the second pool of loans, a principal balance for the second pool of loans, a coupon history for the second pool of loans, a payment history for the second pool of loans, and a borrowers' credit history for the second pool of loans;
   comparing the monitored attribute for the first pool and the monitored attribute for the second pool;
   calculating a payment due based on the comparison of the monitored attribute for the first pool and the monitored attribute for the second pool, and the payment formula; and
   making available an indication of the payment due at the end of the payment cycle,
   wherein the first pool of loans and the second pool of loans are two different pools of loans.

29. The computer readable medium of claim 28, wherein the method for hedging risk of loss on loan investments further comprises:
   generating the first pool based on comparable attributes of the second pool.

30. The computer readable medium of claim 29, wherein the comparable attributes of the second pool includes one or more of the following: number of loans in the second pool, an average dollar amount of the loans in the second pool, a loan origination date, a geographical location, a credit rating score, a loan to value ratio ("LTV"), a payment history, a type of loan.

31. The computer readable medium of claim 28, further comprising a database for storing information about the first pool and second pool.

32. The computer readable medium of claim 28, wherein the method for hedging risk of loss on loan investments further comprises:
   adjusting the first pool based on a relative change in a number of loans in the second pool or a change in a total dollar amount of unpaid principal balance ("UPB") on loans in the second pool.

33. The computer readable medium of claim 28, wherein the payment formula includes a formula for determining losses in the first pool and the second pool.

34. The computer readable medium of claim 28, wherein the payment formula further includes adjustments for determining losses in the first pool if a change occurs to a number of loans in the second pool or a change occurs in a total dollar amount of unpaid principal balance ("UPB") on loans in the second pool.

35. The computer readable medium of claim 28, wherein calculating a payment due comprises:
   determining the payment due to a first party or a second party based on the difference in the performance of the first pool and the second pool.

36. The computer readable medium of claim 28, wherein the method for hedging risk of loss on loan investments further comprises:
   generating an invoice or a payment form based on the calculated payment due, for hedging a loss related to a difference in compared performance between the first pool and the second pool.

37. The computer readable medium of claim 36, wherein generating an invoice or a payment form based on the calculated payment due, comprises:
   generating the payment form for the payment due if the compared performance of the first pool is inferior to the performance of the second pool; otherwise,
   generating the invoice for the payment due if the compared performance of the second pool is inferior to the performance of the first pool.

38. A computer program product comprising:
   a computer usable medium having computer readable instructions embodied therein for enabling a process for hedging risk of loss on loan investments based on established criteria for hedging the risk of loss on the loan investments, including a payment formula and a payment cycle, the computer usable medium comprising:

means for monitoring, during a predefined period of time, at least one attribute of a first pool of loans from a group comprising: a cash flow for the first pool of loans, a dollar loss during a payment cycle for the first pool of loans, a dollar loss frequency for the first pool of loans, a default frequency rate for the first pool of loans, a delinquency rate for the first pool of loans, a number of defaults for the first pool of loans, a principal balance for the first pool of loans, a coupon history for the first pool of loans, a payment history for the first pool of loans, and a borrowers' credit history for the first pool of loans;

means for monitoring, during the predefined period of time, at least one attribute of a second pool of loans from a group comprising: a cash flow for the second pool of loans, a dollar loss during a payment cycle for the second pool of loans, a dollar loss frequency for the second pool of loans, a default frequency rate for the second pool of loans, a delinquency rate for the second pool of loans, a number of defaults for the second pool of loans, a principal balance for the second pool of loans, a coupon history for the second pool of loans, a payment history for the second pool of loans, and a borrowers' credit history for the second pool of loans;

means for comparing the monitored attribute of the first pool and the monitored attribute of the second pool;

means for calculating a payment due based on the comparison of the monitored attribute of the first pool and the monitored attribute of the second pool, and the payment formula; and means for making available an indication of the payment due at the end of the payment cycle, wherein the first pool of loans and the second pool of loans are two different pools of loans.

39. The computer program product of claim 38, wherein the computer usable medium further comprises:

means for generating the first pool of loans based on comparable attributes of the second pool of loans.

40. The computer program product of claim 38, wherein the computer usable medium further comprises:

means for generating an invoice or a payment form based on the calculated payment due, for hedging a loss related to a difference in compared performance between the first pool and the second pool.

41. A system for hedging risk of loss on loan investments based on established criteria for hedging the risk of loss on the loan investments, including a payment formula and a payment cycle, the system comprising:

a processor; and a memory in communication with the processor and storing a program component containing instructions, wherein the processor is operative with the program component to monitor, during a predefined period of time, at least one attribute of a first pool of loans from a group comprising: a cash flow for the first pool of loans, a dollar loss during a payment cycle for the first pool of loans, a dollar loss frequency for the first pool of loans, a default frequency rate for the first pool of loans, a delinquency rate for the first pool of loans, a number of defaults for the first pool of loans, a principal balance for the first pool of loans, a coupon history for the first pool of loans, a payment history for the first pool of loans, and a borrowers' credit history for the first pool of loans;

monitor, during the predefined period of time, at least one attribute of a second pool of loans from a group comprising: a cash flow for the second pool of loans, a dollar loss during a payment cycle for the second pool of loans, a dollar loss frequency for the second pool of loans, a default frequency rate for the second pool of loans, a delinquency rate for the second pool of loans, a number of defaults for the second pool of loans, a principal balance for the second pool of loans, a coupon history for the second pool of loans, a payment history for the second pool of loans, and a borrowers' credit history for the second pool of loans;

compare the monitored attribute of the first pool and the monitored attribute of the second pool;

calculate a payment due based on the comparison of the monitored attribute of the first pool and the monitored attribute of the second pool, and the payment formula; and output the payment due at the end of the payment cycle, wherein the first pool of loans and the second pool of loans are two different pools of loans.

42. The system of claim 41, wherein the processor is further operative with the program component to:

generate the first pool based on comparable attributes of the second pool of loans.

43. The system of claim 41, wherein the processor is further operative with the program component to:

adjust the first pool based on a change in a number of loans in the second pool or a change in a total dollar amount of unpaid principal balance ("UPB") on loans in the second pool.

44. The system of claim 41, wherein the payment formula includes a formula for determining losses in the first pool and the second pool.

45. The system of claim 44, wherein the payment formula further includes adjustments for determining losses in the first pool if a change occurs to a number of loans in the second pool or a change occurs in a total dollar amount of unpaid principal balance ("UPB") on loans in the second pool.

46. The system of claim 41, wherein the processor is operative with the program component to calculate the payment due if losses in the first pool are greater than losses in the second pool, or to calculate the payment due if losses in the second pool are greater than losses in the first pool.

47. The system of claim 41, wherein the processor is further operative with the program component to:

generate an invoice or a payment form based on the calculated payment due, for hedging a loss related to a difference in compared performance between the first pool and the second pool.

48. The system of claim 47, wherein the processor is operative with the program component to generate the payment form for the payment due if the compared performance of the first pool is inferior to the performance of the second pool, or generate the invoice for the payment due if the compared performance of the second pool is inferior to the performance of the first pool.

* * * * *